March 5, 1968
C. R. CAMENISCH
3,371,670
APPARATUS FOR CURING TOBACCO
Filed April 18, 1966
6 Sheets-Sheet 1
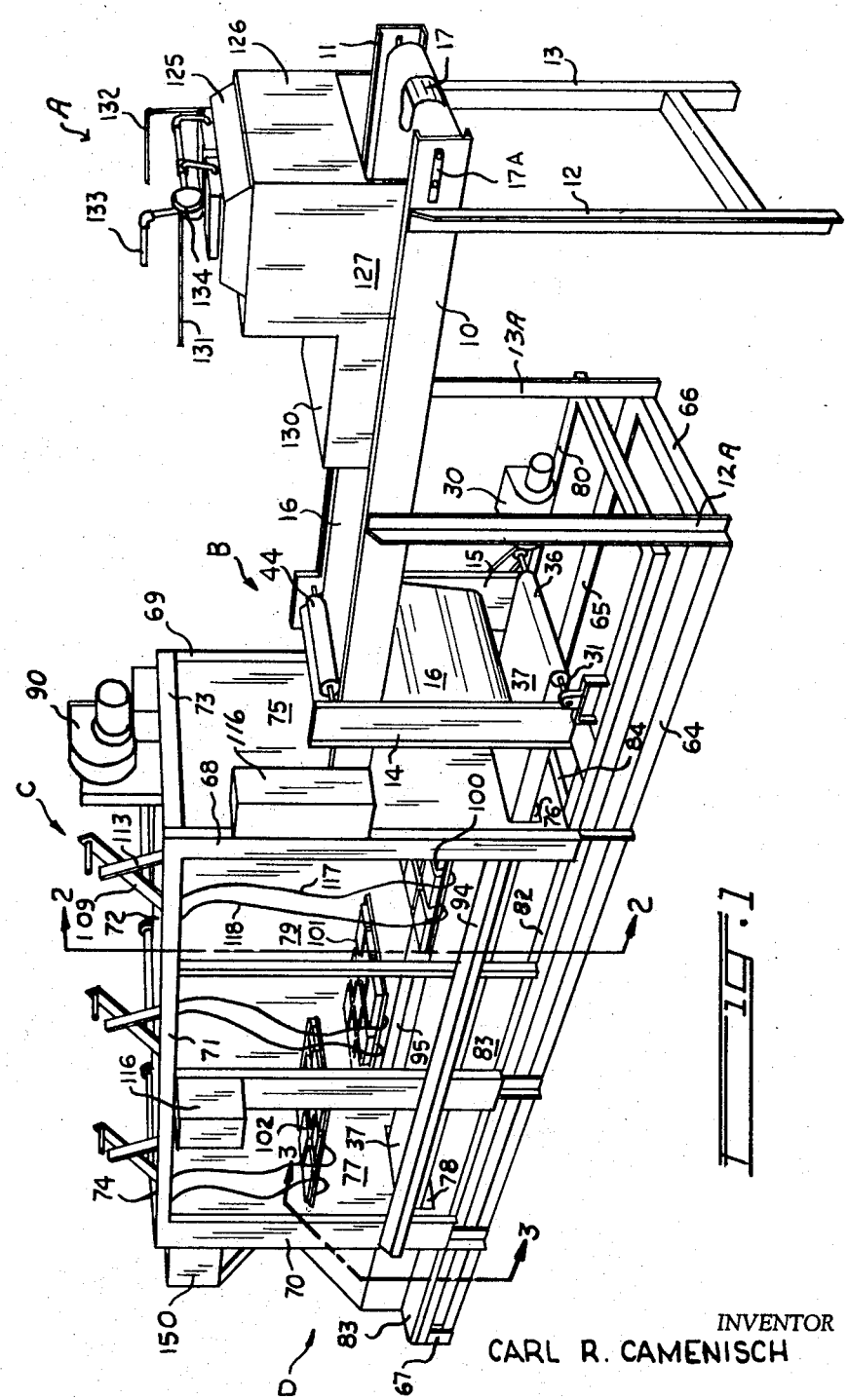
INVENTOR
CARL R. CAMENISCH
BY W. E. Sherwood
ATTORNEY

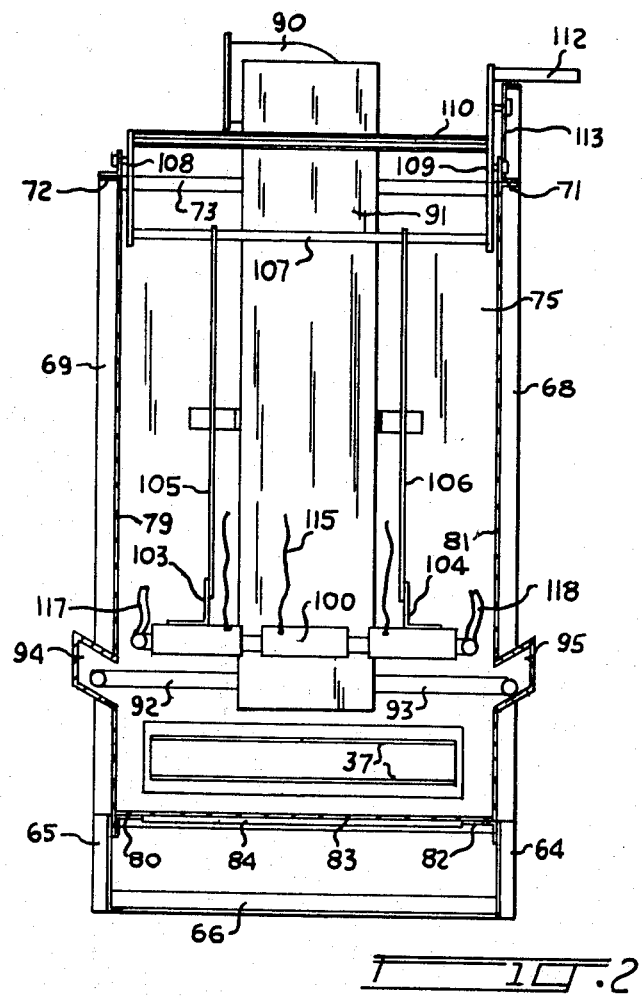

March 5, 1968     C. R. CAMENISCH     3,371,670
APPARATUS FOR CURING TOBACCO
Filed April 18, 1966                        6 Sheets-Sheet 4
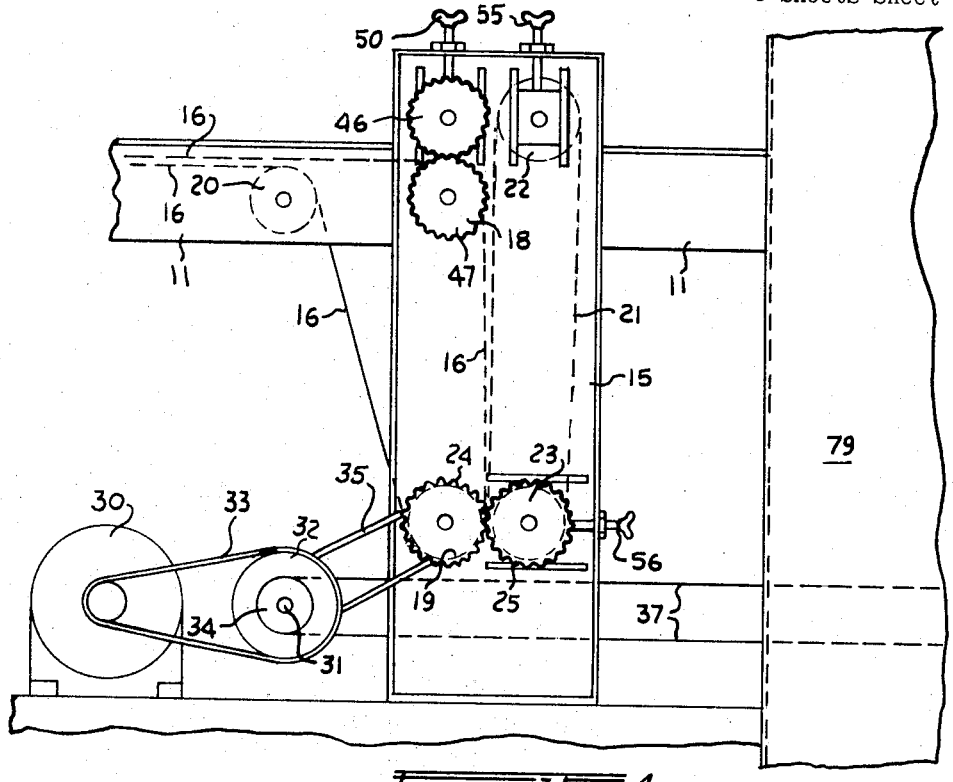
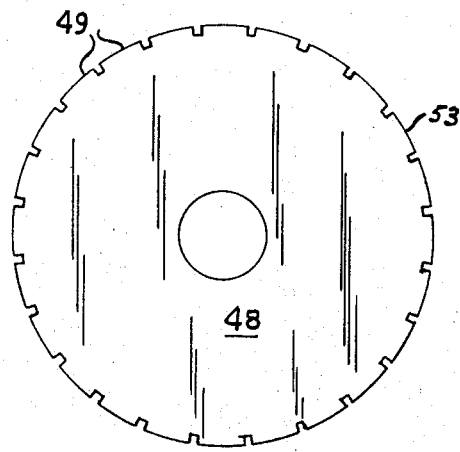
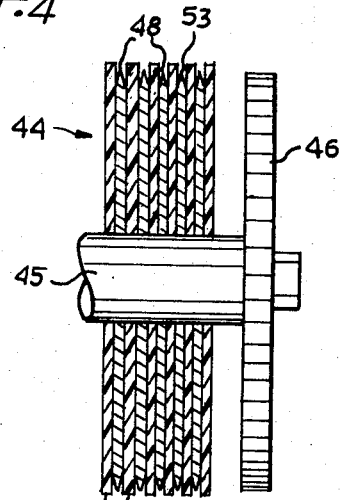
INVENTOR
CARL R. CAMENISCH
BY    W. E. Sherwood
ATTORNEY

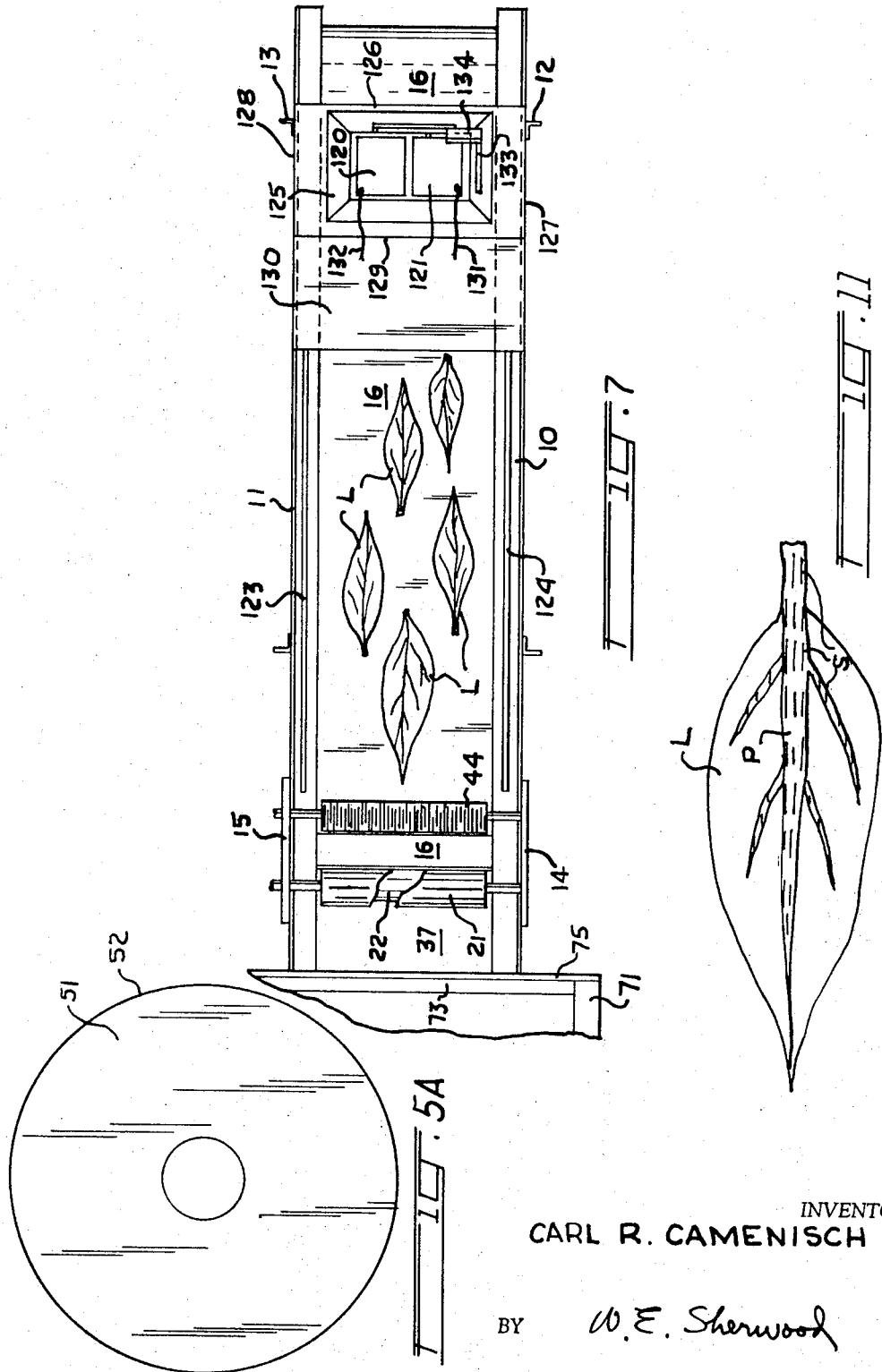

March 5, 1968  C. R. CAMENISCH  3,371,670
APPARATUS FOR CURING TOBACCO
Filed April 18, 1966  6 Sheets-Sheet 6
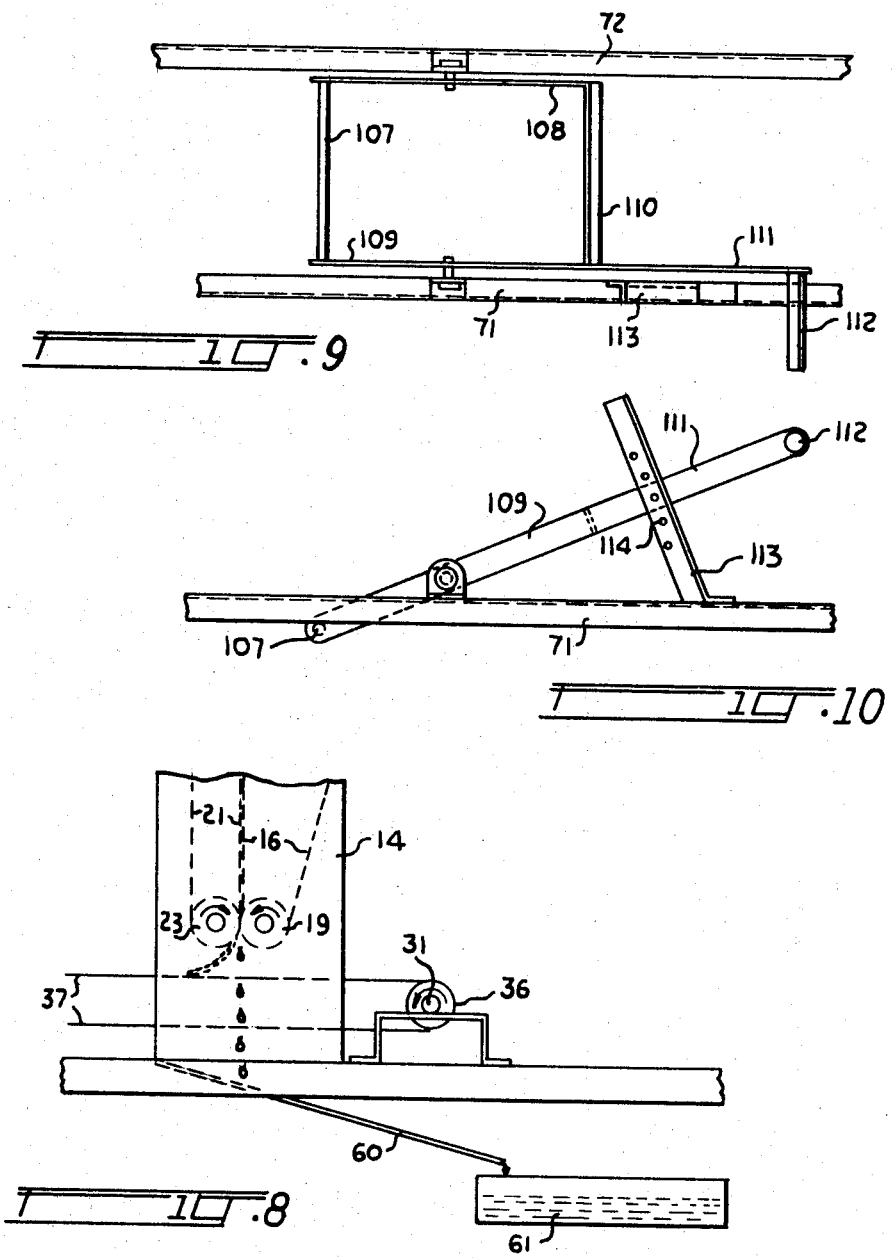
INVENTOR
CARL R. CAMENISCH
BY  W. E. Sherwood
ATTORNEY United States Patent Office 3,371,670
Patented Mar. 5, 1968

3,371,670
APPARATUS FOR CURING TOBACCO
Carl R. Camenisch, U.S. 42, Prospect, Ky. 40059
Filed Apr. 18, 1966, Ser. No. 543,128
7 Claims. (Cl. 131—121)

The present invention relates to an apparatus for curing tobacco leaves detached from the stalk on which they were grown, and more particularly to an apparatus in which an accelerated method for complete curing of the leaves may be practiced and without impairment of the quality of the tobacco so cured.

As more fully disclosed in my copending application, Ser. No. 497,913, filed Oct. 19, 1965, Method for Accelerated Curing of Tobacco, the equipment of the present invention is especially suited for the curing of tobacco leaves which are fed thereto while still having a substantial amount of their original moisture present therein. Such leaves normally will have been removed from the stalk a sufficient time to be wilted and flexible, and will have reached a maturity signified by at least a partial yellowing of the leaf.

An object of this invention is to provide an apparatus for curing tobacco leaves detached from the stalk on which they were grown.

Another object is to provide an apparatus for pretreating tobacco leaves in order to place them in an improved condition for final curing as part of an accelerated curing procedure.

Another object is to provide an apparatus for continuously moving tobacco leaves into and from a pretreating stage and then into and from a final curing stage.

Another object is to provide an apparatus for browning a tobacco leaf prior to extraction of moisture from the stem of the leaf.

A further object is to provide an apparatus for mechanically extracting moisture from the stem of a tobacco leaf without damaging the web of the leaf.

Other objects and advantages of the invention will become apparent as the description proceeds and when considered in conjunction with the accompanying drawings in which FIG. 1 is a perspective view, with parts broken away and with one side wall of the curing compartment removed, showing one form of apparatus embodying the invention and with portions of the heater assemblies being omitted in the interest of clarity of the drawing.

FIG. 2 is a transverse cross-sectional view taken on line 2—2 of FIG. 1 and to a larger scale.

FIG. 3 is a transverse cross-sectional view taken on line 3—3 of FIG. 1 and to a larger scale.

FIG. 4 is a side elevation view showing one form of drive means for the conveyors and the serrating roll.

FIG. 5 is a view of the side face of a serrating disc.

FIG. 5A is a view of the side face of a leaf-ejection disc.

FIG. 6 is a detail view of the drive end portion of the serrating roll with the discs shown in section.

FIG. 7 is a top plan view of the inlet conveyor and associated structure with parts broken away.

FIG. 8 is a detail view showing the transfer station for the pressed leaf between the upper conveyors and the curing conveyor, and indicating not only the leaf-discharging station from the pretreating equipment but also one means for collection of moisture from the serrated stem.

FIG. 9 is a top plan view of the mounting for one of the primary heat sources for the curing compartment.

FIG. 10 is a side elevation view of the mounting seen in FIG. 9, and

FIG. 11 is a plan view of a leaf subsequent to its passage under the serrating roll.

Figure 3A:
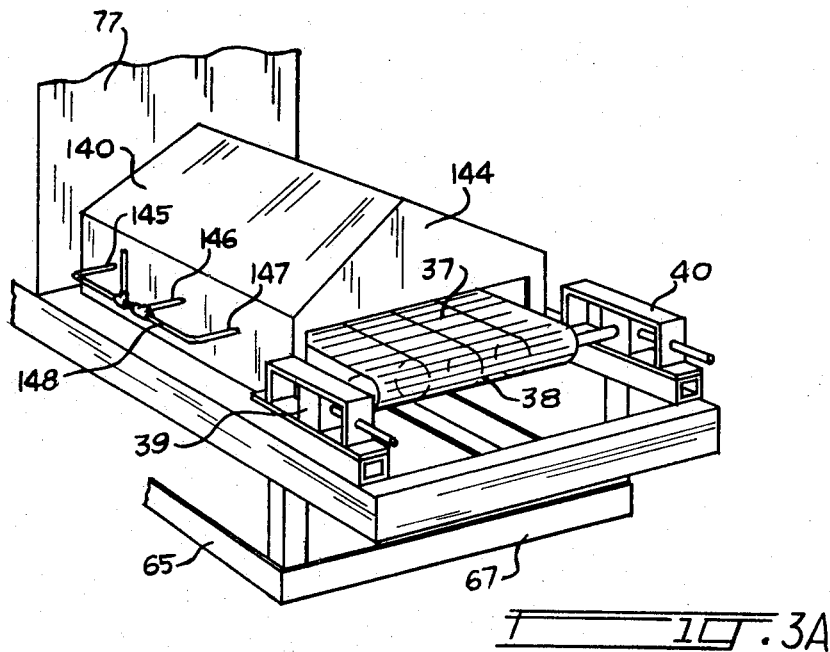
FIG. 3A is a perspective view of the discharge end of the curing conveyor.

Referring first to FIG. 1, the apparatus is suitably coordinated, as to its function and construction, to provide for passage of the tobacco leaves continuously and in sequence through a preheating stage indicated generally at A, a stem-moisture-extraction stage indicated generally at B, a web-and-stem drying stage indicated generally at C, and a moistening or ordering stage indicated generally at D. The apparatus jointly employed at stages A and B serves as a means for pre-treating the leaves in readiness for their later curing in stage C. The length of time for passage of the leaves from the inlet to the outlet of the apparatus depends to some extent upon the particular tobacco being handled, but generally will not be more than five minutes and in some cases may be no longer than one minute. For conveninece, the term, accelerated curing, is employed herein to denote a curing which occurs in these exceptionally short periods of time.

As will be understood, however, the apparatus in its broader aspects, is not limited to use with accelerated curing practices. For example, the movement of the tobacco leaves through the apparatus can be made discontinuous without departing from the invention.

Considering now the portion of the apparatus serving as a means for pretreating the leaves to be cured, and as indicated in FIGS. 1 and 7, an elevated framework is provided with a pair of generally horizontal side rails 10 and 11 supported adjacent their forward ends by legs 12 and 13. These rails are supported adjacent their rearward ends by generally vertical side uprights 14 and 15 of a roll stand and may conveniently be supported intermediate their ends by additional legs 12A and 13A. An input conveyor which may include an endless Teflon or polyvinyl chloride coated fabric belt 16 passes over a roll 17 at the entrance end of the side rails which corresponds to the leaf-feeding station. The belt then passes over an idler roll 18 (FIG. 4) mounted between the uprights of the roll stand, downwardly and around a driven roll 19 mounted between the uprights, upwardly over an idler roll 20 mounted between the side rails, and thence back to roll 17. The region where the belt changes from its downward movement around roll 19 corresponds to the leaf-discharging station of the leaf-pretreating means.

A suitable tensioning means 17A is provided to adjust the position of roll 17 and thereby to regulate the tension maintained on belt 16. Cooperating with the input conveyor 16 and preferably driven in time unison therewith is a transfer conveyor endless belt 21 which conveniently may be of the same material as the input conveyor belt, and which is arranged generally vertically and passes over an upper roll 22 and a lower roll 23 mounted between the uprights 14 and 15. The exterior end of the shaft which mounts roll 19 has keyed thereto a gear 24 which meshes with a gear 25 carried by the exterior end of the shaft which mounts roll 23.

One or more variable speed motors, one being shown at 30 and which may be controlled from one or more locations at which the performance of the apparatus is being observed during the curing of the tobacco, are employed to drive the conveyors as by means of a head shaft 31 which is driven by means of a pulley 32 and belt 33. A second pulley 34 on this shaft drives a pulley mounted on roll 19 through a second belt 35. In this arrangement shaft 31 carries a roll 36 (FIG. 8) over which may be trained in driven engagement therewith an endless perforate, screen-like belt of a curing conveyor 37 mounted generally horizontally and extending completely through the heated curing compartment later to be described. As best shown in FIG. 3A the conveyor 37 which is flexible, and preferably is of a metallic construction, is also trained over a tail shaft 38 which is adapted to be adjusted by tensioning means 39, 40 so as to maintain the proper tension on the curing conveyor and to compensate for wear, expansion, or contraction of the same. When the conveyor 37 is intended to operate intermittently, or at a linear speed greater than that of the associated conveyors, it will, of course, be driven by a separate motor and employ a head shaft other than that shown at 31.

As best shown in FIGS. 5 to 7, the stem-serrating member which serves to puncture the stem fiber and to permit moisture to escape efficiently from the stem, constitutes an important element of the leaf-pretreating means and in one form may include a rotatable member comprising a composite roll 44. Such a roll includes a shaft 45 having a gear 46 keyed to its outer end and meshing with gear 47 keyed to roll 18 with the result that the serrating roll is turned at the same rate of travel as the leaves are being advanced thereto by the conveyor belt 16. Mounted in spaced relation upon shaft 45 and about 1/16 inch apart is an array of thin annular serrating discs 48 having spaced teeth 49 on their peripheries and which are adapted to enter into the stem of the tobacco leaf as it is carried by the upper flight of conveyor 16 into contact with the serrating roll. The shaft of roll 44 may be adjusted by conventional means 50 so as to insure that appropriate depth of stem serrating takes place when different sizes or types of tobacco leaves are to be handled. As will be understood, the teeth 49 of the discs 48 normally will not touch the web portion of the leaf even when the serrating roll is at its closest position to the belt 16.

Moreover, in order to prevent the teeth 49 from embedding in the stem and wrapping the leaf around roll 44, each side of each of the serrating discs 48 is in close contact with the confronting sides of an array of thin annular leaf-ejection discs 51 which are formed preferably of a suitable deformable material such as Neoprene, having an appropriate modulus of elasticity. The outside diameter of the leaf-ejection discs is about 1/16 inch greater than the outside diameter of the serrated discs and the peripheral edge 52 of the leaf-ejection discs is of uniform diameter whereas, the periphery 53 of the serrating disc has a knife edge. As the stem of the leaf is squeezed between belt 16 and the serrating roll 44, the contacting peripheral edges of the discs 51 deform and permit the teeth 49 of the adjacent discs 48 to cut into the stem but when the leaf is carried beyond this point, the restoring force in the material of discs 51 then acts to push the stem out of contact with these teeth.

Considering now FIGS. 4 and 7, it will be noted that the upstream end of curing conveyor 37 is located upstream from and beneath drive roll 19. Accordingly, a leaf dropping from the cooperating conveyor belts 16 and 21 at the leaf-discharging station of the pretreating means is deposited upon the curing conveyor preparatory to its passage through the curing compartment. The location of the respective axes of rolls 18, 19, 22 and 23 is such that the belts 16 and 21 are spaced apart in the region where the serrated-stem leaf starts its downward movement and are in pressing contact with each other adjacent the plane of travel of the curing conveyor 37. In order to provide the proper degree of pressing contact, conventional tensioning means 55 and 56 are provided for adjusting the axes of the rolls 22 and 23 of the transfer conveyor. This feature serves a useful purpose in that is provides for the efficient extraction of moisture from the serrated stem of the tobacco leaf and makes possible the production of a useful by-product. As used herein the term "mechanical extraction of moisture" comprehends the pressing of moisture from the serrated stem by any suitable mechanical means and in contrast to the conventional removal of moisture from tobacco by evaporation.

As best shown in FIG. 8, an inclined drain plate 60 is provided beneath the curing conveyor 37 and drops of moisture pressed from the stems of the leaves fall upon that plate and are directed into a storage receptacle 61. This liquid is rich in nicotine and other compounds useful for various purposes.

When the moisture has been mechanically extracted, the leaf L touches the top flight of conveyor 37 and thereupon is conveyed into the curing compartment now to be described. Moreover, since the speed of conveyor 37, when employing the above-described drive arrangement, is at least as much as the speed of conveyor belts 16 and 21, that leaf is not pulled apart as a result of its movement from the pressing conveyors to the curing conveyor.

Various forms of curing compartments may be employed in connection with the above-described means for pretreating of the leaves. One suitable form is shown in FIGS. 1 and 2 and comprises a generally rectangular framework having lower side beams 64 and 65 with transverse end beams 66, 67. Vertical corner posts, three of which are shown at 68, 69, 70, serve to support elevated side rails 71, 72 which are joined at their ends by cross rails 73, 74. An end wall 75 having a suitable opening 76 therein for passage of conveyor 37 therethrough is supported between posts 68 and 69 and at the outlet end of the curing compartment a similar end wall 77 having an opening 78 therein is mounted between the corresponding posts. An imperforate side wall 79 is fixed to side rail 72 and to the corresponding corner posts and extends downward to a lower side rail 80 to which it is affixed at its lower edge. In addition, an imperforate side wall 81 (FIG. 2) is removably attached to side rail 71 and to corner posts 68, 70 and extends downwardly to a lower side rail 82 to which it is attached at its lower edge. The ends of beams 64, 65 and of rails 80, 82 may conveniently be attached to legs 12A, 13A of the framework of the pretreating means and rails 80, 82 may also serve as a support for the uprights 14, 15 of the roll stand of the pretreating means, as when a compact and mutually reinforced arrangement is desired.

An imperforate floor plate 83 for the curing compartment is attached at its forward end to a lower cross rail, to the side rails 80, 82, and extends beyond the end wall 77 to form a floor for the ordering apparatus, later to be described. This floor is located several inches below the path of travel of the lower flight of conveyor 37. Each of the walls and floor are formed of metallic material having an efficient heat reflectivity value. Mounted at any convenient location is a motor driven blower 90 which forces air into a duct 91 (FIG. 2) which preferably is disposed adjacent the inner surface of front wall 75 and which has lateral conduits 92, 93 extending therefrom. These conduits feed into manifolds 94 and 95 extending longitudinally of the compartment and having a plurality of spaced openings entering into the interior of the compartment and preferably located about the plane of travel of the upper flight of conveyor 37. Such openings are equipped with suitably controlled dampers (not shown) for regulating the relative quantities of air blown into the compartment at the several openings. The openings, moreover, are arranged to discharge the air in such a manner as to avoid interference with the normal functioning of the burners of the several heating assemblies and to avoid disturbing the position of the leaves on conveyor 37.

As a significant feature of the apparatus, a series of separately adjustable heater assemblies disposed longitudinally of the compartment and as indicated generally at 100, 101, and 102 is provided. Each of those assemblies includes a plurality, for example, four of burner elements of the type more fully disclosed in U.S. Patent No. 2,775,294 to Gunther Schwank. As best seen in FIG. 2, each of the heater assemblies is mounted for selective adjustment vertically with respect to the tobacco passing therebelow on conveyor 37, and includes a plurality of brackets supporting that assembly, two of which brackets are indicated at 103, 104. Attached to the brackets are wires 105, 106 which are affixed at their upper ends to a cross rod 107 of an adjusting frame mounted adjacent the open top of the curing compartment. As seen in FIGS. 9 and 10 this frame includes side bars 108, 109 pivotally arranged on the rails 72, 71 and joined by a second cross bar 110 to provide rigidity. The side bar 109 is provided with an extension 111 from which projects a handle 112 affording easy manipulation from the exterior of the compartment. A fixed bracket 113 is mounted on rail 71 and provided with openings 114 into which a detent (not shown) carried by extension 111 may engage in order to hold the heater assembly at the selected height above conveyor 37.

Connected to each of the burner elements in each heater assembly are flexible conductors as indicated at 115 leading to a conventional igniter control box 116 mounted upon the framework of the compartment. Likewise, connected to each burner element is its respective flexible fuel supply conduit leading to a source of gaseous fuel and provided with its individual valve means, all of which is conventional. Two such fuel supply conduits are indicated generally at 117, 118.

Reverting now to the above-described means for pretreating leaves prior to their entry into the curing compartment, the present invention includes an apparatus for pretreating such leaves prior to the mechanical extraction of moisture from the stems of the leaves. As best seen in FIGS. 1 and 7, this preheating may be obtained by means of a separate heater assembly including a pair of burner elements 120, 121 of the Schwank type and mounted at the top of an enclosure which has wheels (not shown) adapted to travel along parallel rails 123, 124 disposed on the top surfaces of the side rails 10 and 11 of the elevated framework. The enclosure includes hood portion 125, a front wall 126, side walls 127, 128, and a rear wall 129. Projecting rearwardly from the rear wall is a cover plate 130 serving as the top boundary for the open rearward end of the enclosure and located in substantially the same plane as the lower edge of front wall 126. Leaves deposited upon conveyor 16 at the leaf-feeding station thus are carried beneath the heater elements and thence to the serrating roll 44 after being browned and after passing beneath the heat confining hood and cover plate 130. Flexible conductors 131 and 132, with sufficient length to accommodate movement of the enclosure, lead from igniter control box 116 to the respective burner elements. In addition, a flexible conduit 133 of appropriate length leads from a supply source of gaseous fuel to a control valve 134 carried by the enclosure and through which valve the regulated amount of fuel is supplied to the respective burner elements 120 and 121. As will now be apparent, the amount of preheating and the resultant browning of the web portion of the leaf, is dependent in part upon the speed of the moving conveyor belt 16 which can be controlled by adjustment of the variable speed motor 30. In general, an appropriate preheating for most types of tobacco leaves is secured when the leaf is raised to a temperature of not less than about 100° F., or not more than about 130° F., and preferably between 110° F. and 125° F., as it moves under the preheating enclosure. The time during which the tobacco remains at this temperature is not less than about five seconds nor more than about 30 seconds, and preferably between 6 and 15 seconds. In any event, a satisfactory preheating will generally be found when a visible browning of the web portion of the leaf is observed as such leaf approaches the serrating roll. The heat output capacity of elements 120, 121, therefore, is chosen so as to secure this visible browning action.

Various types of tobacco and various stages of maturity of a given type of tobacco may require different times for the browning to occur and the adjustability of the distance between the heating enclosure and the serrating roll provides a convenient arrangement for meeting the problem. With a given speed of belt 16, the time available for browning prior to mechanical extraction of moisture from the stem can easily be increased or diminished merely by moving the enclosure along rails 123, 124.

Figure 4A:
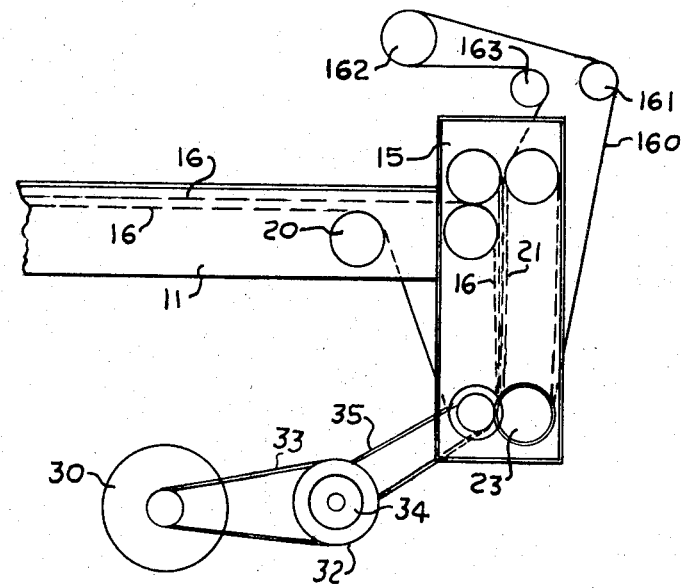
FIG. 4A is a schematic view showing a modified form of apparatus employing an absorbent belt.

Assuming that the leaves L (FIG. 7) are browned to the proper degree when they contact roll 44, the teeth 49 of the discs 48 will then impress upon the stem of the leaf a pattern of parallel rows of slits S (FIG. 11) as the leaf is pressed into contact with transfer conveyor 21. The web portion of the browned leaf, however, is not damaged since the leaf-ejection discs 51 of the roll clears belt 16 by a sufficient distance, for example, about $\frac{1}{16}$ inch. When the leaves pass beyond roll 46 they are carried downward between the converging belts 16 and 21, and a moisture extraction occurs as the serrated stem is squeezed between those belts. This moisture normally falls as discrete drops from the lower end of the roll stand and is collected separately. Use of Teflon belts to which such moisture does not adhere, is recommended. When it is desired to effect a removal of the moisture squeezed from the stem and adhering to the leaf, rather than to collect moisture separately, a modified arrangement as indicated by FIG. 4A may be used. In this arrangement an endless belt 160 of a suitable absorbent material may be trained over the roll 23 between the confronting surfaces of belts 16 and 21 and then pass over idler rolls 161, 162 and 163. This belt 160 preferably is driven by the contact with the other moving belts, although a separate drive could be employed.

In any event, after the mechanical extraction of the moisture from its stem the leaf reaches the leaf-discharging station of the described conveyor belts and then is ready for movement, into and through the above-described curing compartment. When the apparatus of the present invention is to be employed in the accelerated curing process, the leaf will, of course, move automatically from the leaf-discharging station on to conveyor 37 and through the aperture in wall 75 and immediately become subjected to the heating influence of the first infra-red heating assembly 100.

The height of this assembly above the leaves on conveyor 37, as well as the heights of the assemblies 101 and 102 and the longitudinal spacings of the assemblies in the compartment may be widely varied without departing from the invention. Merely as an example, a height of about 13–18 inches from the radiating surface of assembly 100 to the upper flight of conveyor 37 has given good results with conveyor speeds of about 15 feet per minute. The application of the curing heat to the tobacco includes not only the direct radiation from the infra-red elements but also a transfer of heat by convection currents of air and this heating takes place at atmospheric pressure. Heat, moreover, is reflected from the metallic floor 83, and the metallic side walls 79, 81 and the leaves thus receive heat on both sides thereof since the perforate belt of conveyor 37 offers no obstruction to heat transfer. Since the curing compartment has an open top, the products of combustion from the burners are carried upward by the air supplied from manifolds 94 and 95 and moisture liberated by the drying leaf also is removed from the apparatus by this air stream. In general, the leaves carried through the curing compartment are progressively brought to a temperature preferably not less than about 210° F. and not more than about 220° F. by the time they reach the opening 78 in the rear wall 77 of the compartment. At this time the leaves are dry and fragile and require an ordering so as to be handleable. For this purpose there is provided an enclosure, as best shown in FIG. 3 and 3A spaced a short distance from the rear wall 77 of the curing compartment and comprising a hood having imperforate top sections 140, 141 and joined at the sides to vertical walls 142, 143 which in turn are joined at their bottom edges to the floor plate 83 projecting from the curing compartment.

The rear wall 144 of the enclosure has an aperture of sufficient size to accommodate the conveyor 37 and the tobacco leaves resting thereon while extending through wall 142 is a plurality of pipes 145, 146, 147 joined to a header pipe 148 which in turn is connected to a suitable steam generator or boiler 149. This boiler may receive water from an elevated reservoir 150 through supply conduit 151 and may be heated by a suitable means. Each of the pipes 145, 146, 147 extend beneath the upper flight and above the lower flight of conveyor 37 and have upwardly directed nozzles through which steam is ejected to form a suitable ordering environment within the hood. The thus described hood is accordingly substantially filled with steam and as the hot and dry tobacco enters the same it is immediately subjected to controlled moistening or ordering which brings it "in case" and which inhibits shattering or breaking of the leaf as it drops or is picked from the discharge end of conveyor 37. Normally, the moisture content of the leaf upon leaving this ordering stage is about 8–12% by weight. As will be noted from FIG. 11, the intermediate stem fibre portions P both longitudinally and transversely of the slits S in the stem remain connected to each other following the moisture extraction treatment, and thus the stem of the cured leaf discharged from the conveyor 37 still retains a certain measure of tensile strength which is useful in manual handling of the cured leaf. Various forms of serrating or equivalent means may be used to form the slits S in the stems and as used herein the term "serrating" is intended to comprise various ways of opening the surface of the leaf stem to permit moisture to escape. Thus, slitting, puncturing, or perforating, or the like are included in the term.

As will now be apparent to those skilled in the art, the apparatus is sufficiently flexible in its functioning to enable it to handle many varieties of tobacco. For example, by controlling the speed of motor 30 the speed of each of the coordinated conveyors may readily be changed to accommodate a different type or condition of tobacco. Merely by moving the preheating enclosure along its rails the degree of browning can be modified and merely by adjusting the heights of the heating assemblies in the curing compartment or by modifying the air supply, the degree of drying of the leaves can be regulated.

Having thus described the invention it will be understood that various changes and modifications can be made in the apparatus disclosed without departing from the true spirit and scope of the invention. It, therefore, is intended to cover such modifications and changes within the following claims.

What is claimed is:

1. Apparatus for curing tobacco leaves detached from the stalk comprising, means for mechanically extracting moisture from the stems of the leaves, conveyor means having a generally horizontal portion for carrying the leaves to said moisture extracting means and a downwardly directed portion for carrying the leaves therefrom, a heated curing compartment, and means for moving the leaves through said compartment following their removal from said moisture extracting means and from contact with said conveyor means.

2. Apparatus as defined in claim 1 wherein said means for moving said leaves through said compartment comprises a perforate belt driven simultaneously with said conveyor means, said conveyor means discharging leaves upon said belt thereby to effect a continuous movement of leaves through said apparatus.

3. In an apparatus for curing tobacco leaves detached from the stalk, means for pretreating the leaves for subsequent passage through a heated curing compartment and comprising, an endless conveyor extending from a leaf-feeding station to a leaf-discharging station, means for driving said conveyor, a movable stem-serrating member mounted in proximity to the surface of said conveyor intermediate said stations for slitting the steams of leaves carried by said conveyor, means for moving said member, means for pressing moisture from the stems only of said leaves following the slitting of the same, and leaf preheating means mounted in proximity to said conveyor intermediate the leaf-feeding station and said serrating member for radiating heat upon said leaves, said preheating means having a heat output capacity sufficient to effect a visible browning of the web portion of said leaves under the influence of the radiated heat and prior to the contact of the stems of said leaves with said stem-serrating member.

4. Apparatus as defined in claim 3 wherein said means for moving said member is driven by said means for driving said conveyor.

5. Apparatus as defined in claim 3 wherein said preheating means is adjustable toward and from said stem-serrating member, thereby to vary the time for browning of said leaves prior to extraction of moisture from the stem of said leaves.

6. Apparatus as defined in claim 3 wherein said stem-serrating member comprises means for forming slits in said stem spaced from adjacent slits both transversely and longitudinally of said stem thereby to provide in the stem a residual tensile strength of the stem following its contact with said member.

7. Apparatus as defined in claim 3 wherein said leaf-preheating means comprises infra-red heating elements.

References Cited

UNITED STATES PATENTS

| | | | |
|---|---|---|---|
| 772,892 | 10/1904 | Lauhoff | 131—140 |
| 1,122,747 | 12/1914 | Hammerstein | 131—147 |
| 1,401,438 | 12/1921 | Pells | 131—147 |
| 1,447,075 | 2/1923 | Gutman | 131—147 |
| 1,547,428 | 7/1925 | Long | 131—147 |
| 1,754,117 | 4/1930 | Pacini | 131—121 |
| 1,813,833 | 7/1931 | Andrews | 131—121 |
| 1,926,036 | 9/1933 | Chesley | 131—121 |
| 2,446,822 | 8/1948 | Grapp | 34—17 |
| 2,519,304 | 8/1950 | Whitley | 146—119 |
| 3,145,716 | 8/1964 | Gietz et al. | 131—133 |

ALDRICH F. MEDBERY, *Primary Examiner.*